US008864996B2

(12) United States Patent
Leta et al.

(10) Patent No.: US 8,864,996 B2
(45) Date of Patent: *Oct. 21, 2014

(54) REDUCTION OF CONRADSON CARBON RESIDUE AND AVERAGE BOILING POINTS UTILIZING HIGH PRESSURE ULTRAFILTRATION

(75) Inventors: Daniel P. Leta, Flemington, NJ (US);
Edward W. Corcoran, Easton, PA (US);
Brian Erik Henry, Manvel, TX (US);
James D. Dearth, Chamblee, GA (US);
Kirk C. Nadler, Houston, TX (US);
Stephen M. Cundy, Lebanon, NJ (US);
Miroslav Petro, San Jose, CA (US);
Thomas H. McWaid, Fremont, CA (US); Li Song, Cupertino, CA (US); Yan Ying Chan, Mountain View, CA (US)

(73) Assignee: Exxonmobil Research and Engineering Company, Annandale, NJ (US)

(*) Notice: Subject to any disclaimer, the term of this patent is extended or adjusted under 35 U.S.C. 154(b) by 353 days.

This patent is subject to a terminal disclaimer.

(21) Appl. No.: 11/980,156

(22) Filed: Oct. 30, 2007

(65) Prior Publication Data
US 2009/0057226 A1 Mar. 5, 2009

Related U.S. Application Data

(60) Provisional application No. 60/966,471, filed on Aug. 28, 2007.

(51) Int. Cl.
| *C07C 7/144* | (2006.01) |
| *B01D 61/22* | (2006.01) |
| *B01D 61/14* | (2006.01) |
| *B01D 71/36* | (2006.01) |
| *B01D 71/56* | (2006.01) |
| *C10G 31/11* | (2006.01) |
| *B01D 71/02* | (2006.01) |
| *B01D 71/06* | (2006.01) |

(52) U.S. Cl.
CPC .......... *B01D 61/145* (2013.01); *B01D 2221/04* (2013.01); *B01D 2325/02* (2013.01); *B01D 2257/702* (2013.01); *B01D 71/36* (2013.01); *B01D 71/56* (2013.01); *C10G 31/11* (2013.01)
USPC ........................... 210/650; 210/634; 210/637

(58) Field of Classification Search
CPC ...... B01D 61/145; B01D 61/22; B01D 71/56;
B01D 71/36; B01D 37/045; B01D 2311/14;
B01D 2257/702; B01D 2257/7022; B01D
2257/7027; B01D 2325/02; B01D 71/028;
B01D 2221/04; C01G 31/11; C01G 31/09
USPC ................................. 210/634, 637, 649–651
See application file for complete search history.

(56) References Cited

U.S. PATENT DOCUMENTS

| 2,947,687 A | 10/1954 | Lee |
| 3,684,697 A | 8/1972 | Gamson |

(Continued)

FOREIGN PATENT DOCUMENTS

| CA | 2185264 | 9/1996 |
| EP | 0160142 | 11/1985 |

(Continued)

OTHER PUBLICATIONS

NSF International, Environmental technology verification report: Physical removal of microbiological particulare and organic contaminants in drinking water, Aug. 2000, 3 pages.*

(Continued)

*Primary Examiner* — Katherine Zalasky
(74) *Attorney, Agent, or Firm* — Bruce M. Bordelon; Andrew T. Ward

(57) ABSTRACT

This invention relates to a process for producing a product stream with improved reduction of Conradson Carbon Residue ("CCR") and a reduced average boiling point from a heavy hydrocarbon feedstream utilizing a high-pressure, low-energy separation process. The invention may be utilized to reduce the CCR content and reduce the average boiling point in heavy hydrocarbon feedstreams, such as whole crudes, topped crudes, synthetic crude blends, shale oils, bitumen, oil from tar sands, atmospheric resids, vacuum resids, or other heavy hydrocarbon streams. This invention also results in a process with an improved CCR separation efficiency while maintaining permeate flux rates.

22 Claims, 1 Drawing Sheet

(56) References Cited

U.S. PATENT DOCUMENTS

| | | | |
|---|---|---|---|
| 3,919,075 A | 11/1975 | Parc et al. | |
| 3,990,963 A | 11/1976 | Audibert et al. | |
| 4,115,465 A | 9/1978 | Elfert et al. | |
| 4,120,900 A | 10/1978 | Evers et al. | |
| 4,134,824 A | 1/1979 | Kamm et al. | |
| 4,169,782 A | 10/1979 | Thompson | |
| 4,259,170 A | 3/1981 | Graham et al. | |
| 4,411,790 A | 10/1983 | Arod et al. | |
| 4,504,377 A | 3/1985 | Shu et al. | |
| 4,536,281 A * | 8/1985 | Hettinger et al. | 208/113 |
| 4,592,832 A | 6/1986 | Bristow et al. | |
| 4,617,126 A | 10/1986 | Funk et al. | |
| 4,661,241 A | 4/1987 | Dabkowski et al. | |
| 4,780,205 A * | 10/1988 | Murakami et al. | 210/321.8 |
| 4,797,200 A | 1/1989 | Osterhuber | |
| 4,814,088 A | 3/1989 | Kutowy et al. | |
| 4,816,140 A | 3/1989 | Trambouze et al. | |
| 4,874,523 A | 10/1989 | LaFreniere | |
| 4,892,660 A | 1/1990 | Sweet | |
| 4,908,134 A | 3/1990 | Anderson | |
| 4,946,594 A | 8/1990 | Thaler et al. | |
| 4,963,303 A | 10/1990 | Anderson | |
| 4,978,454 A | 12/1990 | Sweet | |
| 4,982,051 A | 1/1991 | Pasternak et al. | |
| 5,045,206 A | 9/1991 | Chen et al. | |
| 5,045,354 A | 9/1991 | Feimer et al. | |
| 5,107,056 A | 4/1992 | Chen et al. | |
| 5,107,058 A | 4/1992 | Chen et al. | |
| 5,107,059 A | 4/1992 | Chen et al. | |
| 5,173,172 A | 12/1992 | Adams et al. | |
| 5,180,496 A | 1/1993 | Sartori et al. | |
| 5,191,151 A | 3/1993 | Eriksen et al. | |
| 5,256,297 A | 10/1993 | Feimer et al. | |
| 5,372,709 A * | 12/1994 | Hood | 210/90 |
| 5,505,841 A * | 4/1996 | Pirbazari et al. | 210/90 |
| 5,514,252 A | 5/1996 | Kerby, Jr. et al. | |
| 5,635,055 A | 6/1997 | Sweet et al. | |
| 5,643,442 A | 7/1997 | Sweet et al. | |
| 5,749,943 A | 5/1998 | Shimazu et al. | |
| 5,785,860 A | 7/1998 | Smith | |
| 5,979,178 A | 11/1999 | Engler et al. | |
| 6,180,008 B1 | 1/2001 | White | |
| 6,187,987 B1 | 2/2001 | Chin et al. | |
| 6,190,533 B1 | 2/2001 | Bradow et al. | |
| 6,524,469 B1 | 2/2003 | Schucker | |
| 6,525,469 B1 | 2/2003 | Huang et al. | |
| 6,896,796 B2 | 5/2005 | White et al. | |
| 7,018,517 B2 | 3/2006 | Kurita et al. | |
| 7,041,212 B2 | 5/2006 | White et al. | |
| 7,048,846 B2 | 5/2006 | White et al. | |
| 2003/0019790 A1 | 1/2003 | Schucker | |
| 2004/0026321 A1 | 2/2004 | Minhas et al. | |
| 2004/0251166 A1 | 12/2004 | Alvarenga Baptista et al. | |
| 2004/0251201 A1 | 12/2004 | Chau et al. | |
| 2006/0016727 A1 | 1/2006 | Varadaraj | |
| 2006/0231462 A1 | 10/2006 | Johnson | |
| 2006/0231492 A1 | 10/2006 | Sabottke et al. | |
| 2007/0090020 A1 | 4/2007 | Buchannan et al. | |
| 2008/0116109 A1 | 5/2008 | McCoy et al. | |

FOREIGN PATENT DOCUMENTS

| | | |
|---|---|---|
| EP | 0146298 B1 | 5/1991 |
| EP | 0489573 B1 | 9/1995 |
| GB | 1266180 | 12/1969 |
| GB | 2268186 | 1/1994 |
| JP | 54013509 | 7/1977 |
| JP | 2000288371 | 4/1999 |
| JP | 2001038159 | 8/1999 |
| KR | 2002007235 | 1/2002 |
| WO | WO 00/06526 | 2/2000 |
| WO | WO 01/60771 A1 | 8/2001 |
| WO | WO 02/50212 A2 | 6/2002 |
| WO | WO 03/026781 A1 | 4/2003 |
| WO | WO 2004/018067 A2 | 3/2004 |
| WO | WO 2006/040328 A1 | 4/2006 |

OTHER PUBLICATIONS

V. S. Ravi-Kumar, Theodore T. Tsotsis, Muhammad Sahimi; "Studies of Transport of Asphaltenes through Membranes Using Hindered Diffusion Theories for Spheres and Spheroids," Ind. Eng. Chem. Res. 1997, 36, pp. 3154-3162.

Anna Duong, Goutam Chattopadhyaya, Wellington Y. Kwok, Kevin J. Smith; "An experimental study of heavy oil ultrafiltration using ceramic membranes," Fuel, vol. 76, No. 9, pp. 821-828, 1997.

B. D. Sparks, J. D. Hazlett, O. Kutowy, T. A. Tweddle; "Upgrading of Solvent Extracted Athabasca Bitumen by Membrane Ultrafiltration," AIChe Journal, Aug. 1990, vol. 36, No. 8, pp. 1279-1282.

Bruce Bishop, Robert Goldsmith, Robert Schucker, Keith Rawlins; "Ceramic Membrane Process for Upgrading Vacuum Residual Oil," Presentation at AIChE 2004 Spring Annual Meeting, New Orleans, LA, Apr. 25-29, 89d.

W. C. Lai, K. J. Smith; "Heavy oil microfiltration using ceramic monolith membranes," Fuel 80 (2001) pp. 1121-1130.

J. D. Hazlett, O. Kutowy, T. A. Tweddle, B. A. Farnand; "Processing of crude oils with polymeric ultrafiltration membranes," AIChE 1989 Spring National Meeting (Houston Apr. 2-6, 1989) AIChE Symposium Series V85 N. 272, 101-107 (1989).

Deqing Shi, Hongwei Yu, Jinrong Yang, Zhihau Zhang, Ying Kong; "Study on the separation performance of polyimide nanofiltration membrane for solvent recovery in the butanone-toluene dewaxing process of lube oil," Mo Kexue Yu Jishu (2005), 25(3), 50-53, 62. Abstract.

Zhi-Ping Zhao, Jiding Li, Jian Chen, Cui-Xian Chem; "Nanofiltration membrane prepared from polyacrylonitrile ultrafiltration membrane by low-temperature plasma," Journal of Membrane Science (2005), 251(1-2), 239-245. Abstract.

F. Petrus Cuperus, Katrin Ebert; "Non-aqueous application of NF," Nanofiltration (2005), 521-536, Editor(s): Schafer, A.I.; Fane, A.G.; Waite, Thomas D., Publisher: Elsevier Ltd., Oxford, UK. Abstract.

B. Bishop, R. Goldsmith, R. Schucker, K. Rawlins; "Ceramic membrane process for upgrading vacuum residual oil," 2004 AIChE Spring Meeting, Conference Proceedings, New Orleans, LA, 7p (2004) Abstract.

M. V. Veazey; "Tech trends: Microfiltration system," Materials Performance 43/5 15 (May 2004), Abstract.

T. Melin, M. Gallenkemper, J. Hoppe, C. Matthias, "Achema reports . Membrane engineering," Chemie-Ingenieur-Technik (Achema 2003 27(sup)t(sup)h International Exhibition-Congress on Chemical Engineering, 76/12 1869-1876, Dec. 2003., Abstract.

V. I. Il'In, V. A. Kolesnikov, A. V. D'Yachenko; "Electrically insulating petroleum oils and their refining," Oboronnyi Kompleks—Nauchno-Tekhnicheskomu Progressu Rossii (2002), (4), 69-71. Abstract.

A. P. Aleksandrin, A. A. Egorshev, O. V. Katsereva, E. A. Komyagin, V. N. Mynin, G. V. Terpugov; "Use of ceramic membranes for treatment end regeneration of depleted petroleum products," Tyazh. Mashinostr. -/6 30-32 (2002) Chemical Abstracts 138/5-6 Abstr. No. 58512 (2003). Abstract.

"Process industries exposition: Membrane rejects emulsified oils while maintaining hydrophilic properties," Chemical Engineering Progress 97/4 26 (Apr. 2001). Abstract.

K. J. Smith, W. C. Lai; "Heavy oil microfiltration using ceramic monolith membranes," Fuel, 80/8, 1121-1130 (Jun. 2001). Abstract.

R. M. Gould, L. S. White, C. R. Wildemuth; "Membrane separation in solvent lube dewaxing," Environmental Progress, 20/1, 12-16 (Apr. 2001). Abstract.

N. A. Bhore, R. M. Gould, S. M. Jacob, P. O. Staffeld, D. McNally, P. H. Smiley, C. R. Wildemuth; "New membrane process debottlenecks solvent dewaxing unit," Oil and Gas Journal, 97/46, 67-68, 70, 72-24 (1999 1115). Abstract.

Jiao-Li Li, Xu-Xiang Li, Bing-Hua Ni; "Development of ultrafiltration and its application in recovery of dewaxing solvent," Shihua Jishu Yu Yingyong (2000), 18(5), 295-297, 301. Abstract.

(56) References Cited

OTHER PUBLICATIONS

S. Elmaleh, N. Ghaffor; "Upgrading oil refinery effluents by cross-flow ultrafiltration," Water Science & Technology, 34(9), 231-238 (1996), Aqualine Abstracts Abstr. No. 97-4463 V13 N.9 (Sep. 1997). Abstract.
B. Park, V. S. Ravi-Kumar, T. T. Tsotsis; "Models and simulation of liquid—phase membrane reactors," Industrial & Engineering Chemistry Research, V37 N. 4, 1276-89 (Apr. 1998). Abstract.
A. Duong, K. J. Smith; "A model of ceramic membrane fouling during heavy oil," Canadian Journal of Chemical Engineering, V75 N. 6, 1122-29 (Dec. 1997). Abstract.
M. Garcia Sanchez, J. L. Perez Pavon, B. Moreno Cordero; J. Chromatogr., A, 766 (1+2), 61-69 (1997) Chemical Abstracts Abstr. No. 319181 V126 N. 24. Abstract.
V. S. Ravi-Kumar, T. T. Tsotsis, M. Sahimi; "Studies of the transport of asphaltenes through membranes using hindered diffusion theories for spheres and spheroids," Industrial & Engineering Chemistry Research, V36 N. 8, 3154-62 (Aug. 1997). Abstract.
V. S. Ravi-Kumar, L. Yang, T. T. Tsotsis; "Liquid-phase reactive applications with inorganic membranes : Models and experiments," ACS 214$^{th}$ National Meeting (Las Vegas Sep. 7-11, 1997) Book of Abstracts Part 2 Abstr. No. PMSE-273 (1997). Abstract.
A. Duong, G. Chattopadhyaya, W. Y. Kwok, K. J. Smith; "An experimental study [using Cold Lake (Alberta) oil] of heavy oil ultrafiltration using [single-tube] ceramic membranes," Fuel, V76, N. 9, 821-28 (Jul. 1997). Abstract.
S. Elmaleh, N. Ghaffor; "Upgrading oil refinery effluents by cross-flow ultrafiltration," Water Sci. Technol., 34(9), Water Quality International '96 Part (2), 231-238 (1996) Chemical Abstracts Abstr. No. 79315, V126 N. 6. Abstract.
E. Beaver, Siegel; Technologies critical to a changing world / Clean technologies), AIChE et al. 5$^{th}$ World Chemical Engineering Congress (San Diego Jul. 14-18, 1996) Summary Proceedings 100-03, 159-61 (Oct. 1996). Abstract.
W. Ying, B. Tansel; "Effect of coagulation on fouling rate and cleanability of ultrafiltration membranes," Purdue University 50$^{th}$ Industrial Waste Conference (West Lafayette, IN May 8-10, 1996) Proceedings 285-95 (1995). Abstract.
J. L. Humphrey; "Separation processes: Playing a critical role," Chemical Engineering Progess, V91, N. 10, 31-41 (Oct. 1995). Abstract.
V. N. Zrelov, N. G. Postnikova, L. V. Krasnaya; "Rapid membrane (diffusion) methods for determining mechanical impurities in liquid petroleum products," Khimiya I Tekhnologiya Topliv i Masel, N. 4, 28-30 (1994). Abstract.
B. D. Sparks, J. D. Hazlett, O. Kutowy, T. A. Tweddle, Union Carbide Corp.; "Upgrading of solvent extracted Athabasca bitumen by membrane ultrafiltration," AIChE Journal V36, N. 8, 1279-82 (Aug. 1990). Abstract.
R. J. Torres-Ordonez, S. G. Kukes, F. S. Lee, D. C. Cronauer; "Characterization of solids from coal/resid(ue) coprocessing," ACS 200$^{th}$ National Meeting (Washington, DC Aug. 26-31, 1990) ACS Division of Fuel Chemistry Preprints V35 N.4, 1048-55 (1990). Abstract.
J. D. Hazlett, O. Kutowy, T. A. Tweddle, B. A.Farnand; "Processing of Crude Oils with Polymeric Ultrafiltration Membranes," Nat'l. Res. Counc. Can.; Can. Cent. Miner. Energy Technol, 1989 AIChE Spring Nat'l Meeting (Houston Apr. 2-6, 1989), Prepr. N. 64f 18P.
B. D. Sparks, J. D. Hazlett, O. Kutowy, T. A. Tweddle; "Upgrading of solvent extracted Athabasca bitumen by Membrane ultrafiltration," AIChE 1987 Summer Natl. Meet. (Minneapolis 816-19/87 Prepr. N. 7D 22P. Abstract.
M. Nishimura; "Application and development of membrane separation processes in oil chemistry and its related fields," Yakagaku, 34(3), 171-7 (1985), Chem. Abstr. Abstr. No. 168846 V102 N. 20. Abstract.
D. S. Schuster, C. A. Irani; "Understanding the pour point depression mechanism—2, microfiltration analysis of crude oils," 189$^{th}$ ACS Natl. Meet. (Miami Beach Apr. 28-May 3, 1985) ACS Div. Fuel Chem. Prepr. V30 N.1, 169-77 (1985). Abstract.
J. Durandet; "Separation (Processes) in the refining industry/introduction separations dans le raffinage/introduction," Pet. Tech. N.298 5-6 (May 1983). Abstract.
J. Briant, G. Hotier; "The state of asphaltenes in hydrocarbon mixtures the size of molecular clusters," Rev. Inst. Fr. Pet. V38 N.1 83-100 (Jan.-Feb. 1983). Abstract.
D. Defives, R. Avrillon, C. Miniscloux, R. Roullet, X. Marze; "Regeneration of used lubricating oils by ultrafiltration," Informations Chimie (1978), 175, 127-31. Abstract.
A. Duong, K. Smith, JCS University of British Columbia; Canadian Journal of Chemical Engineering V75 N. 6, 1122-29 (Dec. 1997). Abstract.
V. N. Zrelov, N. G. Postnikova, L. V. Krasnaya; "Analytical filtration of petroleum and synthetic products through membranes," Khim. Tekhnol. Topl. Masel (1984), (11), 32-4. Abstract.
R. J. Thrash, R. H. Pildes; "The diffusion of Petroleum asphaltenes (from a Middle East high-sulfur vacuum residuum) through well characterized (MICA) porous membranes," 181$^{st}$ ACS Natl. Meet (Atlanta Mar. 29-Apr. 3, 1981) ACT Div. Pet. Chem. Prepr. V26 N.2515-25 (Mar. 1981). Abstract.
D. D. Spatz; "Ultrafiltration . . . The membranes, the process, and its application to organic molecule fractionation (Including industrial oil/water separations)," 178$^{th}$ ACS Natl. Meet. (Washington, DC Sep. 9-14, 1979) Abstr. Pap. Abstr No. COLL-125. Abstract.
G. Sartori, W. S. Ho, R. E. Noone, B. H. Ballinger; "(New) poly(fluoroolefin) membranes for aromatics/saturates separation," AIChE 1997 Annual Meeting (Los Angeles Nov. 16-21, 1997) Preprint N.32d 6P. Abstract.
V. S. Ravi-Kumar, I. A. Webster, T. T. Tsotsis, R. C. Sane, M. Sahimi; "Studies of diffusion of petroleum liquid macromolecules through model membranes," AIChE 1992 Annual Meeting (Miami Beach Nov. 1-5, 1992) Preprint N.22g 3P. Abstract.
R. C. Sane, I. A. Webster, T. T. Tsotsis, V. S. Ravi-Kumar; "Studies of asphaltene diffusion and structure and their implications for resid(uum) upgrading," 12$^{th}$ International "Chemical Reaction Engineering Today" Symposium (Turin, Italy Jun. 28-Jul. 1, 1992) Chemical Engineering Science V47 N.9-11 2683-88 (Jun.-Aug. 1992). Abstract.
R. C. Sane; "The diffusion of petroleum asphaltenes in porous membranes," University of Southern California, Dissertation (1991) (Abstract) Dissertation Abstracts International: Section B Science & Engineering V52 N.8 4350-B (Feb. 1992). Abstract.
Yong Woo Rho, Hwayong Kim, Won Hee Park; "Effect of oil viscosity on ultrafiltration flux," Hwahak Konghak (1989), 27(4), 446-50. Abstract.
Yujun Song, Fuan Liu, Yong Yang, Jian Zou, Benhui Sun, Tianyuan Zhong; "Review on the preparation and application of nanofiltration membrane," Huagong Keji (1999), 7(3), 1-7. Abstract.
May-Britt Haag; "Membranes in chemical processing. A review of applications and novel developments," Separation and Purification Methods (1998), 27(1), 51-168. Abstract.
H. Zuern, K. Kohlhase, K. Hedden, J. Weitkamp; "Developments in refinery technology—1. Process technology, processing of crudes, residua, and heavy oils," 50$^{th}$ DGMK Anniv. Meet (Berline Nov. 24-26, 1983) Erdoel Kohle, Erdgas, Petrochem. Brennst. Chem. V37 N.2 52-69 (Feb. 1984). Abstract.
R. E. Baltus, J. L. Anderson; "Hindered diffusion of asphaltenes through microporous membranres," Chemical Engineering Science (1983), 38(12) 1959-69. Abstract.
A. Duong, K. J. Smith; "A model of ceramic membrane fouling during heavy oil utlrafiltration," Canadian Journal of Chemical Engineering V75 N.6 1122-29 (Dec. 1997). Abstract.

\* cited by examiner

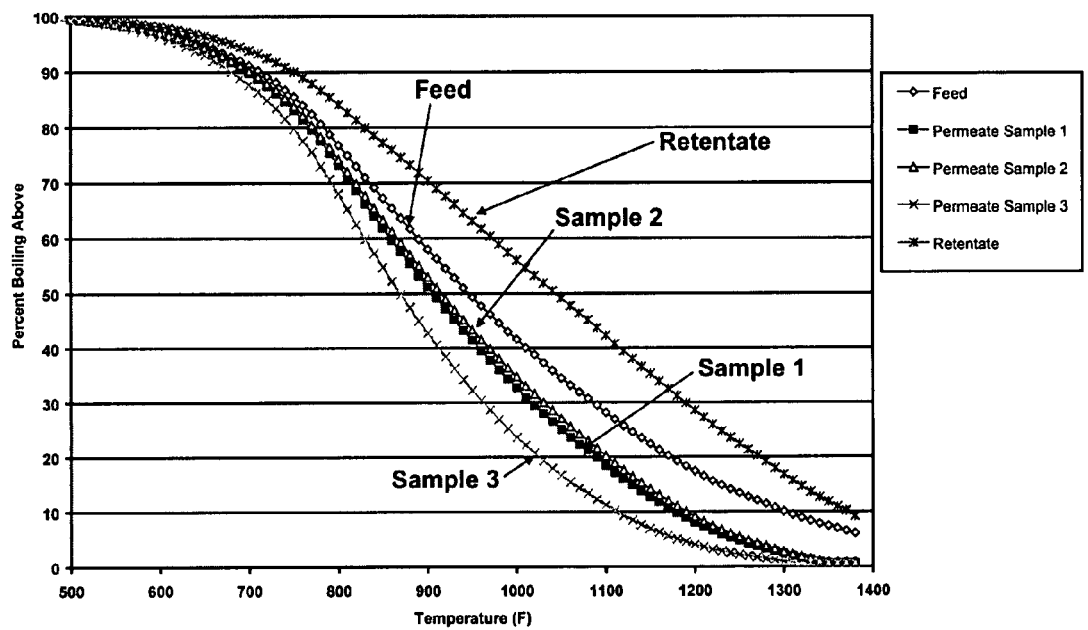

REDUCTION OF CONRADSON CARBON RESIDUE AND AVERAGE BOILING POINTS UTILIZING HIGH PRESSURE ULTRAFILTRATION

This application claims the benefit of U.S. Provisional Application No. 60/966,471 filed Aug. 28, 2007.

FIELD OF THE INVENTION

This invention relates to a process for producing a product stream with improved reduction of Conradson Carbon Residue ("CCR") and a reduced average boiling point from a heavy hydrocarbon feedstream utilizing a high-pressure, low-energy separation process. The invention may be utilized to reduce the CCR content and reduce the average boiling point in heavy hydrocarbon feedstreams, such as whole crudes, topped crudes, synthetic crude blends, oils derived from shale, oils derived from bitumen, oils derived from tar sands, atmospheric resids, vacuum resids, or other heavy hydrocarbon streams. This invention also results in a process with an improved CCR separation efficiency while maintaining permeate flux rates.

BACKGROUND OF THE INVENTION

As the demand for hydrocarbon-based fuel has increased, the need for improved processes for separating hydrocarbon feedstocks of heavier molecular weight and higher contaminant levels has increased as well as the need for increasing the conversion of the heavy portions of these feedstocks into more valuable, lighter fuel products. These heavier, "challenged" feedstocks include, but are not limited to, low API gravity, high viscosity crudes from such areas of the world as the Middle East, Mexico, Venezuela, Russia, as well as less conventional refinery feedstocks derived from such sources as bitumen, shale oil and tar sands. It is also important that heavy crude fractions, such as atmospheric resids, vacuum resids, and other similar intermediate feedstreams containing boiling point materials above about 850° F. are processed in such a manner so as to improve their ability to be utilized as feedstreams for refinery catalytic conversion processes. These catalytic conversion processes are vital economic components of a modern refinery system as they are utilized to improve the overall conversion of the feedstream into commercially valuable fuel and specialty petrochemical products.

A major problem that exists with these high molecular weight feedstreams is that in their raw state, these streams often possess relatively high Conradson Carbon Residue ("CCR") values which can range from about 1 to about 30 wt %. The CCR value of a hydrocarbon stream is an indication of the amount of carbon in a unit amount of the stream. Hydrocarbon streams that contain high CCR values, especially in excess of about 2 to 5 wt %, can be undesirable for use in some refinery catalytic conversion processes as they tend to increase the amount of coke in the refinery catalytic conversion processes and deactivate the catalysts at an unacceptable high rate for practical or optimal commercial use of these high CCR containing feedstreams to the conversion processes. As a result, these feedstreams are often downgraded to a lower value process, or mixed with other, lower boiling point hydrocarbon streams prior to processing in the conversion units. This latter processing scheme results in a decrease in the amount of overall heavy hydrocarbon feed that a given conversion unit can process and can still result in above optimum catalyst coking and catalyst deactivation rates.

In U.S. Pat. No. 4,814,088 to Kutowy et al., a polysulfone membrane was utilized to improve several heavy oil feeds. The Examples show the membrane to be effective in removing metals and reducing the viscosity. However, the process requires a sulfone based polymer membrane which further requires an initial swelling step and is limited to use in low viscosity feedstreams (below 600 centipose), requiring either the feed content to restricted in composition, or the system to be maintained at temperatures high enough to maintain the feedstream at this low viscosity. The use of a diluent is also suggested to maintain the viscosity within functional limits.

Similarly, U.S. Pat. No. 4,797,200 to Osterhuber et al. utilizes a cellulose or polyvinylidine fluoride polymer membrane in conjunction with a diluent to separate remove metals and reduce the microcarbon residue of a heavy hydrocarbon feed. The disclosed process is limited to pressures of about 215 psig (1500 kPa) and temperatures of about 257° F. (125° C.).

Other membrane materials, such as ceramics, have been utilized in the past, but have experienced certain limitations. In U.S. Pat. No. 5,785,860 to Smith, a ceramic membrane was utilized to separate a heavy crude oil stream. However, this process requires the permeate to be recycled to the feedstream for a period of time to condition the membrane prior to use. As a result, the pore structure of the membrane is to fouled reducing pore size and thus impacting the flow properties of the membrane.

U.S. Pat. No. 5,173,172 to Adams et al. utilizes a membrane separation process to make an 85/100 penetration asphalt. This process utilizes polymeric or ceramic membranes with process pressure and temperature limitations of 30 to 400 psig and 302 to 392° F. (150 to 200° C.), respectively.

Therefore, there exists in the industry a need for improved low energy membrane separations processes for economic reduction of the CCR content of a heavy oil feed.

SUMMARY OF THE INVENTION

The invention includes an improved low energy membrane separations process for producing a product stream with improved reduction of CCR content from a high molecular weight feedstream.

One embodiment of the current invention is a process for producing an improved product stream, comprising:

a) conducting a high molecular weight hydrocarbon feedstream with a final boiling point of at least 1100° F. to a membrane separation zone wherein the feedstream contacts a first side of at least one porous membrane element;

b) retrieving at least one retentate product stream from the first side of the porous membrane; and c) retrieving a permeate product stream from a second side of the porous membrane element;

wherein the transmembrane pressure across the porous membrane element is at least 400 psig, the retentate product stream has a higher wt % of Conradson Concarbon Residue (CCR) than the hydrocarbon feedstream, and the permeate product stream has a lower wt % of Conradson Concarbon Residue than the hydrocarbon feedstream.

In another embodiment of the present invention, the hydrocarbon feedstream in the membrane separation zone is from about 100 to about 350° C. Preferably, the Conradson Concarbon Residue (CCR) content of the permeate product from the process is less than 75% of the Conradson Concarbon Residue content of the hydrocarbon feedstream.

In a preferred embodiment, the process utilizes a porous membrane element with a porosity from about 0.001 to about 2 microns. In more preferred embodiments, the transmembrane pressure across the porous membrane element is at least 700 psi, even more preferably, the transmembrane pressure across the porous membrane element is at least 1000 psi.

BRIEF DESCRIPTION OF THE DRAWINGS

The FIGURE hereof illustrates the decreased boiling point properties of a permeate product produced by one embodiment of the current invention.

DETAILED DESCRIPTION OF THE PREFERRED EMBODIMENTS

The invention includes a process for an improved low energy membrane separations process for improved reduction of CCR content from a heavy oil feed. The improved feedstream can then be further processed in refinery catalytic conversion processes.

Some of the terms utilized herein are defined as follows. The terms "Conradson Carbon Residue" or "CCR" or "Micro Carbon Residue" or "MCR" are considered herein as equivalents and are defined herein as the tendency of a petroleum stream to form carbon deposits under high temperature conditions in an inert atmosphere, and may be expressed commonly as Micro Carbon Residue ("MCR") or alternatively Conradson Carbon Residue ("CCR"). Micro Carbon Residue is typically measured using ASTM Method D-4530.

The term "average boiling point" as used herein is defined as the mass weighted average boiling point of the molecules in a mixture. This may be determined by simulated distillation gas chromatography (also referred to herein as "SIM-DIS"). The term "final boiling point" is defined as the temperature at which 95 wt % of the mixture is volatized at atmospheric (standard) pressure.

The term "high molecular weight" is defined herein as compounds that have molecular weights in excess of 400 atomic units.

The term "hydrocarbon feedstream" or "hydrocarbon stream" as used herein is defined as a fluid stream that is comprised at least 80% hydrocarbon compounds by weight percentage.

The term "transmembrane pressure" as used herein is defined as the difference in pressure as measured across a membrane element being the difference in pressure between the higher pressure feed/retentate side of the membrane element and the lower pressure permeate side of the membrane elements.

What has been discovered is the use of an improved ultrafiltration process to produce a low CCR product stream from high molecular weight hydrocarbon containing feedstreams. These high molecular weight hydrocarbon feedstreams are comprised of hydrocarbon compounds with molecular weights of at least 400 atomic mass units and generally have final boiling points greater than about 1100° F. Such feedstreams include, but are not limited to, whole crudes, topped crudes, synthetic crude blends, oils derived from shale, oils derived from bitumen, oils derived from tar sands, atmospheric resids, vacuum resids, as well as similar heavy hydrocarbon raw feedstocks, pipelineable intermediate products, or intermediate refining product streams containing components with a final boiling point greater than about 1100° F.

In the current invention, a high molecular weight containing hydrocarbon feedstream is supplied to a membrane separation zone to produce a permeate product stream which has a the Conradson Carbon Residue (CCR) content lower than the CCR content of the original feedstream. As can be seen on the Examples herein, in a preferred embodiment of the present invention, the Conradson Concarbon Residue wt % content of the permeate product stream is less than 75% of the Conradson Concarbon Residue wt % content of the hydrocarbon feedstream In even more preferred embodiments the Conradson Concarbon Residue wt % content of the permeate product stream is less than 60%, and even more preferably less than 50% of the Conradson Concarbon Residue (CCR) wt % content of the hydrocarbon feedstream.

In a preferred embodiment, the permeate product will also have a lower average boiling point than the feedstream to the membrane separation zone. In another preferred embodiment, the permeate product will also have a lower final boiling point than the feedstream to the membrane separation zone. It is preferred if the hydrocarbon feedstream has a CCR content of at least 1 wt %, more preferably at least 3 wt % and even more preferably at least 5 wt %.

The current invention utilizes a membrane separation assembly at high transmembrane pressures, above at least about 400 psi, to produce a product stream with a reduced CCR content and average boiling point from a heavy hydrocarbon feedstream. In embodiments of the present invention, the transmembrane pressure is at least about 700 psi, or the transmembrane pressure is at least about 1000 psi. In other embodiments, the transmembrane pressure is at least about 1200 psi, or even at least about 1500 psi. In other preferred embodiments, transmembrane pressure ranges for operation of the present invention are from about 400 to about 3000 psi, or about from 700 to about 2500 psi, or even about from 1000 to about 2000 psi, respectively.

It has been found that operation of the current invention at these high transmembrane pressures, not only is the permeate product flux rate increased, but it has also unexpectedly been discovered that the CCR reduction in the permeate is also increased. In preferred embodiments of the present invention, the temperatures of the feedstream to the membrane separation zone are about 212 to about 662° F. (100 to 350° C.), more preferably about 212 to about 572° F. (100 to 300° C.), and even more preferably about 212 to about 482° F. (100 to 250° C.).

In a preferred embodiment, the present invention utilizes a membrane separation zone comprising a polymer membrane, such as but not limited to, porous polytetrafluoroethylene (PTFE) and porous nylons. In another preferred embodiment, the present invention utilizes a porous ceramic membrane, a sintered metal membrane, a porous glass membrane, or a combination thereof. Most preferred is the use a porous ceramic membrane, a sintered metal membrane, or a membrane utilizing both ceramics and sintered metals. In a preferred embodiment, the average pore size of the membrane is in the range from about 0.001 to about 2 microns (μm), more preferably about 0.002 to about 1 micron, and even more preferably about 0.004 to about 0.1 microns.

At the higher transmembrane pressures, not only are flux rates improved, but it has been discovered that an improved product permeate can be produced with less CCR and a lower average boiling point. Additionally, it has been found even with residual feedstocks, that the current invention can achieve high total permeate yields, resulting in larger volumes of the improved permeate product being recovered. Preferably, the overall yield of the permeate as a percentage of the feed will be at least 20 wt %, more preferably at least 30 wt %, more preferably at least 40 wt %, and most preferably at least 50 wt % as measured a percentage of the feed.

In a preferred embodiment, the heavy hydrocarbon feedstream may be flowed across the face of the membrane element(s) in a "cross-flow" configuration. In this embodiment, in the retentate zone, the heavy hydrocarbon feed contacts one end of the membrane element and flows across the membrane, while a retentate product stream is withdrawn from the other end of the retentate zone. As the feedstream/retentate flows across the face of the membrane, a composition selective in saturated compounds content flows through the membrane to the permeate zone wherein it is drawn off as a permeate product stream. In a cross-flow configuration, it is preferable that the Reynolds number in at least one retentate zone of the membrane separations unit be in the turbulent range, preferably above about 2000, and more preferably, above about 4000. In some embodiments, a portion of a retentate stream obtained from the membrane separation units may be recycled and mixed with the feedstream to the membrane separations unit prior to contacting the active membrane.

The Examples below illustrate the improved product qualities and the benefits of the current invention for producing an improved product stream from a heavy hydrocarbon containing feedstream via ultrafiltration with the membranes and operating conditions of the present invention.

EXAMPLES

Example 1

In this Example, an Arab Light Atmospheric Resid was utilized as a feedstream to the membrane separation zone according to one embodiment of this invention. The properties of the Arab Light Atmospheric Resid feedstream utilized in this example are shown in Table 1 below.

TABLE 1

| Feedstream Description | Density @ 70° C. (g/cm$^3$) | Viscosity @ 40° C. (cP) | Viscosity @ 100° C. (cP) | MCR (wt %) | Sulfur (wt %) |
|---|---|---|---|---|---|
| Arab Light Atmos Resid | 0.951 | 828 | 35 | 10.1 | 3.3 |

A membrane element consisting of 0.03 micron porous nylon was utilized in the membrane separation zone. The membrane separation zone was comprised of an feed inlet zone, which was in fluid contact with one side of the porous membrane. The feed zone was pressurized and stirred to keep the feed composition properly mixed. A permeate stream was drawn during testing from a permeate zone located on the opposite side of the porous membrane from the feed zone. In this batch experiment, the feed/retentate was not sampled until the end of the experiment and became progressively more concentrated in MCR and higher boiling point components as the lighter boiling point and lower MCR content permeate stream was withdrawn.

The temperature and pressure of the feedstream were varied during the testing of this example. The permeate zone was held at approximately atmospheric pressure and approximately at the same temperature as the feed zone. The MCR of the fedstream was tested at the beginning and at the end of the test run. Permeate samples were continuously drawn during the test and the MCR content was measured in accordance with ASTM Method D-4530. Flux rates and cumulative yields were also measured during the test. The test conditions, sample numbers and results of this example are shown in Table 2. The "Pre-Samples" shown in Table 2 were utilized to allow time for the establishment of pseudo-steady state flux and selectivities for the process following conditions changes. The "Permeate Samples" were taken and measured for CCR content after the changes in process conditions were maintained for a sufficient amount of time to equilibrate the process.

TABLE 2

| Sample No. | Feedstream Pressure (psig) | Temperature (° C.) | Feedstream MCR (wt %) | Permeate MCR (wt %) | % Reduction in MCR | Permeate Flux Rate (gal/ft$^2$/day) | Permeate Yield (% of feed) |
|---|---|---|---|---|---|---|---|
| Initial Feed | | | 10.1 | | | | |
| Pre-Sample A | 200 | 75 | | | | 0.97 | 7.2 |
| Permeate Sample 1 | 200 | 75 | | 4.0 | 60.4[1] | 0.07 | 19.0 |
| Pre-Sample B | 400 | 75 | | | | 0.06 | 23.8 |
| Permeate Sample 2 | 400 | 75 | | 3.2 | 68.3[1] | 0.05 | 30.3 |
| Pre-Sample C | 700 | 75 | | | | 0.07 | 31.0 |
| Pre-Sample D | 700 | 75 | | | | 0.04 | 34.2 |
| Permeate Sample 3 | 700 | 75 | | 2.9 | 71.3[1] | 0.03 | 42.5 |
| Pre-Sample E | 700 | 93 | | | | 0.17 | 44.1 |
| Pre-Sample F | 700 | 93 | | | | 0.03 | 46.0 |
| Permeate Sample 4 | 700 | 93 | | 6.3 | 37.6[1] | 0.05 | 48.7 |
| Permeate Sample 4 | 700 | 93 | | 6.3 | 59.9[2] | 0.05 | 48.7 |
| Final Retentate | | | 15.7 | | | | |

Notations:
[1] MCR reduction is calculated as a function of the initial feedstream MCR
[2] MCR reduction is calculated as a function of the final feedstream MCR As can be seen from the data in Table 2, it was unexpectedly discovered that the higher pressures improved, i.e., reduced, the MCR content in the product permeate stream instead of reducing the selectivity as per conventional expectations. It can be seen that as the feedstream pressure was increased to 400 and 700 psig, an improvement of about 10% in the amount MCR reduction was found.

In actuality, the MCR (or CCR) reduction in the 400 psig and 700 psig samples were even greater than indicated during the sample periods as these reductions are measured as compared to the initial feedstream CCR values. At these points in the testing process, the CCR value of the feedstream would have been higher than the initial CCR content of 10.1 wt % due to prior permeate draw-offs. This is shown by comparing the CCR content of the last permeate sample ("Permeate Sample 4") to both the initial CCR content of the feedstream and the final CCR content of the feedstream. When compared to the initial CCR content of the feedstream, the Permeate Sample 4 which was obtained under the feedstream conditions of 700 psig and 93° C., a CCR reduction of 37.6% is calculated. However, it is more accurate to determine the CCR reduction of Permeate Sample 4 in comparison with the final CCR content of the feedstream which more accurately indicates a CCR reduction of about 59.9% for the current invention.

This example shows that a high molecular weight species containing hydrocarbon stream can be separated according to the presently claimed invention at low temperatures and without a diluent with improved CCR reduction at high transmembrane pressures.

Example 2

In this example, a test was run in a similar fashion to the test described in Example 1 above, with the exception that the membrane utilized in the membrane separation zone was an expanded polytetrafluoroethylene ("PTFE") membrane and the feedstream to the membrane separation zone utilized in this example was a pentane deasphalted oil recovered from the Arab Light Atmospheric Resid described in Table 1 of Example 1, above. The PTFE membrane had a permeability classification of 5000 Gurley Seconds.

As similar to Example 1, the pressure of the feedstream was varied during the testing of this example. The permeate zone was held at approximately atmospheric pressure and approximately the same temperature as the feed zone. The MCR of the feedstream was tested at the beginning and at the end of the test run and the permeate samples were periodically drawn during the test and the MCR content was measured. Flux rates and cumulative yields were also measured during the test. The test conditions, sample numbers and results of this example are shown in Table 3. Similar to Example 1, the "Pre-Samples" shown in Table 3 were utilized to allow time for the establishment of pseudo-steady state flux and selectivities for the process following conditions changes and the "Permeate Samples" were taken and measured for MCR content after the changes and process conditions were maintained for a sufficient amount of time.

TABLE 3

| Sample No. | Feedstream Pressure (psig) | Temperature (° C.) | Feedstream MCR (wt %) | Permeate MCR (wt %) | % Reduction in MCR | Permeate Flux Rate (gal/ft²/day) | Permeate Yield (% of feed) |
|---|---|---|---|---|---|---|---|
| Initial Feed | | | 6.5 | | | | |
| Pre-Sample A | 200 | 75 | | | | 0.20 | 6.5 |
| Permeate Sample 1 | 200 | 75 | | 3.5 | 46.2[1] | 0.15 | 34.9 |
| Pre-Sample B | 200 | 75 | | | | 0.09 | 47.3 |
| Permeate Sample 2 | 200 | 75 | | 3.9 | 40.0[1] | 0.07 | 52.3 |
| Pre-Sample C | 400 | 75 | | | | 0.07 | 53.3 |
| Pre-Sample D | 700 | 75 | | | | 0.05 | 56.7 |
| Permeate Sample 3 | 700 | 75 | | 1.9 | 70.8[1] | 0.03 | 62.9 |
| Permeate Sample 3 | 700 | 75 | | | 86.0[2] | 0.03 | 62.9 |
| Final Retentate | | | 13.5 | | | | |

Notations:
[1]MCR reduction is calculated as a function of the initial feedstream MCR
[2]MCR reduction is calculated as a function of the final feedstream MCR As can be seen from the data in Table 3, similar to Example 1, the higher pressures improved, i.e., reduced, the MCR content in the product permeate stream instead of reducing the selectivity as expected while utilizing the deasphalted resid feedstream. Here it can be seen that even in a deasphalted feed with a lower initial MCR content, that by utilizing the high feedstream pressures of about 700 psig, a significant increase in MCR reduction was experienced. As the data shows, there was about a 25% increase in MCR reduction by operating at 700 psig vs. operating at 200 psig with the PTFE membrane utilized to separate the deasphalted resid feedstream.

Similar to the comparison in Example 1, the MCR (or CCR) content of the last permeate sample ("Permeate Sample 3") was compared to both the initial CCR content of the feedstream and the final CCR content of the feedstream to determine CCR reduction percentages. When compared to the initial CCR content of the feedstream, the Permeate Sample 3 which was obtained under the feedstream conditions of 700 psig and 75° C., a CCR reduction of 70.8% is calculated. However, it is more accurate to measure the CCR content of Permeate Sample 3 with the final CCR content of the feedstream which more accurately indicates a CCR reduction of about 80.0% for the current invention.

The attached FIGURE shows the simulated distillation gas chromatography or "SIMDIS" results corresponding to the feed and permeate samples shown in Table 3 above. It can be seen from the FIGURE that the boiling point distributions corresponding to the Permeate Sample #3 of the present invention at a feedstream pressure of 700 psig resulted in improved, i.e. reduced, average boiling point reduction over the Permeate Samples #1 and #2 taken at the process feedstream pressure of 200 psig. Also it can be seen in the attached FIGURE that the average boiling point (i.e., the 50% boiling point) of the Feed Sample is about 950° F. and the average boiling point (i.e., the 50% boiling point) of the Permeate Sample #3 is about 875° F. Therefore the current invention can obtain a permeate product with average boiling point of at least about 50° F., more preferably at least about 75° F., lower than the average boiling point of the feedstream to the process.

Example 3

In this example, an improved permeate product stream was obtained by ultrafiltration of an atmospheric resid feedstream separated utilizing a ceramic 5 kD (kiloDalton) cutoff membrane. The average pore size of the membrane was estimated to be about 0.005 microns (μm). The samples utilized for the atmospheric resid feedstream were two portions of a single sample of atmospheric resid. There was some slight variation shown in the initial MCR testing of the two test runs. In the first test run, one portion of the sample was subjected to separation at a feedstream pressure of 500 psig. In the comparative test run the second portion was tested under the same conditions except at a much higher feedstream pressure.

The results of the two comparative tests are shown in Tables 4 and 5, below. The terms and test methods in the tables of this example are similar to those utilized in Examples 1 and 2 above. The permeate zone pressure was held at approximately atmospheric pressure and approximately the same temperature as the feed zone. The Pre-Samples in the Tables 4 and 5 of this example were taken during the ramping of the system to final feedstream operating pressures.

TABLE 4

| Sample No. | Feedstream Pressure (psig) | Temperature (° C.) | Feedstream MCR (wt %) | Permeate MCR (wt %) | % Reduction in MCR | Permeate Flux Rate (gal/ft²/day) | Permeate Yield (% of feed) |
| --- | --- | --- | --- | --- | --- | --- | --- |
| Initial Feed | | | 8.6 | | | | |
| Pre-Sample A | 20-500 | 200 | | | | 4.30 | 5.2 |
| Permeate Sample 1 | 500 | 200 | | 4.0 | 53.5[1] | 4.55 | 16.9 |
| Permeate Sample 2 | 500 | 200 | | 4.2 | 51.2[1] | 3.51 | 26.4 |
| Permeate Sample 3 | 500 | 200 | | 4.2 | 51.2[1] | 3.03 | 36.1 |
| Permeate Sample 4 | 500 | 200 | | 4.9 | 43.0[1] | 1.73 | 66.0 |
| Permeate Sample 5 | 500 | 200 | | 5.2 | 39.5[1] | 0.95 | 69.3 |
| Permeate Sample 5 | 500 | 200 | | 5.2 | 69.6[2] | 0.95 | 69.3 |
| Final Retentate | | | 17.1 | | | | |

Notations:
[1] MCR reduction is calculated as a function of the initial feedstream MCR
[2] MCR reduction is calculated as a function of the final feedstream MCR

TABLE 5

| Sample No. | Feedstream Pressure (psig) | Temperature (° C.) | Feedstream MCR (wt %) | Permeate MCR (wt %) | % Reduction in MCR | Permeate Flux Rate (gal/ft²/day) | Permeate Yield (% of feed) |
| --- | --- | --- | --- | --- | --- | --- | --- |
| Initial Feed | | | 8.1 | | | | |
| Pre-Sample A | 20-1500 | 200 | | | | 1.85 | 3.6 |
| Permeate Sample 1 | 1500 | 200 | | 2.6 | 67.9[1] | 3.67 | 13.7 |
| Permeate Sample 2 | 1500 | 200 | | 2.4 | 70.4[1] | 3.11 | 22.4 |
| Permeate Sample 3 | 1500 | 200 | | 3.0 | 63.0[1] | 1.81 | 54.0 |
| Permeate Sample 4 | 1500 | 200 | | 3.8 | 53.1[1] | 0.91 | 60.7 |

TABLE 5-continued

| Sample No. | Feedstream Pressure (psig) | Temperature (° C.) | Feedstream MCR (wt %) | Permeate MCR (wt %) | % Reduction in MCR | Permeate Flux Rate (gal/ft²/day) | Permeate Yield (% of feed) |
|---|---|---|---|---|---|---|---|
| Permeate Sample 4 | 1500 | 200 | | 3.8 | 77.6[2] | 0.91 | 60.7 |
| Final Retentate | | | 17.0 | | | | |

Notations:
[1]MCR reduction is calculated as a function of the initial feedstream MCR
[2]MCR reduction is calculated as a function of the final feedstream MCR As can be seen comparing the results of the two comparative test runs, the test run at a feedstream pressure of 1500 psig produced a permeate product stream with an overall higher reduction of CCR content. This shows that a ceramic membrane can be utilized in the present invention at very high pressures to produce an improved CCR reduction permeate product.

Example 4

In this example, a feedstream consisting of a composited permeate obtained from the same atmospheric resid feedstream as used in Example 3 was separated under test conditions modeling a steady state separations process in accordance with the present invention. During the tests, the retentate zone was stirred and a an amount of retentate was extracted in a fixed ratio to the permeate flux rate in order to simulate a steady-state ultrafiltrations process. The permeate yield % was maintained at a constant rate throughout all test runs of this example.

In the first segment of this example, the feedstream was separated into a permeate and a retentate stream utilizing a 15 kD (kiloDalton) cutoff ceramic membrane. The average pore size of the membrane was estimated to be about 0.01 microns ($\mu m$). Here, in two separate runs, the feedstream was separated at a feedstream pressure of approximately 600 psig (611 psig actual) and approximately 1200 psig (1211 psig actual) to illustrate the benefits of the current invention. The permeate zone pressure was held at approximately atmospheric pressure and approximately the same temperature as the feed zone. The results from this series of tests are shown in Table 6.

TABLE 6

| Sample No. | Feedstream Pressure (psig) | Temperature (° C.) | Feedstream MCR (wt %) | Permeate MCR (wt %) | % Reduction in MCR | Permeate Flux Rate (gal/ft²/day) | Permeate Yield (% of feed) |
|---|---|---|---|---|---|---|---|
| Test 4-A | 611 | 180 | 2.95 | 2.34 | 20.7 | 3.80 | 70.0 |
| Test 4-B | 1211 | 180 | 2.95 | 1.80 | 39.0 | 4.19 | 70.0 |
| % Increase in MCR Reduction | | | | | Δ = 18.3% | | |

As can be seen in this example, upon modeling of a steady state system, all aspects of the separations process of the present invention were unexpectedly improved at the a feedstream pressure of 1211 psig as compared to the lower feedstream pressure of 611 psig. While the flux rate would be expected to increase at the higher transmembrane pressures, it has unexpectedly been discovered that the CCR wt % in the permeate is improved, even at constant yield rates.

In the second segment of this example, the feedstream was separated into a permeate and a retentate stream in a similar manner to the first segment of this example except an 8 kD (kiloDalton) cutoff ceramic membrane was utilized in the separation process. The average pore size of the membrane was estimated to be about 0.008 microns (μm). Here, in two separate runs, the feedstream was separated at a feedstream pressure of approximately 600 psig (617 psig actual) and approximately 1200 psig (1212 psig actual) to illustrate the benefits of the current invention. The permeate zone pressure was held at approximately atmospheric pressure and approximately the same temperature as the feed zone. The results from this series of tests are shown in Table 7.

TABLE 7

| Sample No. | Feedstream Pressure (psig) | Temperature (° C.) | Feedstream MCR (wt %) | Permeate MCR (wt %) | % Reduction in MCR | Permeate Flux Rate (gal/ft²/day) | Permeate Yield (% of feed) |
|---|---|---|---|---|---|---|---|
| Test 4-C | 617 | 180 | 2.95 | 2.10 | 28.8 | 1.44 | 70.0 |
| Test 4-D | 1212 | 180 | 2.95 | 1.70 | 42.4 | 2.59 | 70.0 |
| % Increase in MCR Reduction | | | | | Δ = 13.6% | | |

Similar to the first tests of this example, upon modeling of a steady state system, all aspects of the separations process of the present invention were unexpectedly improved at the a feedstream pressure of 1212 psig as compared to the lower feedstream pressure of 617 psig. Again, while the flux rate would be expected to increase at the higher transmembrane pressures, it has been unexpectedly been discovered that the CCR wt % reduction in the permeate is improved, even at constant yield rates.

In both segments of this example, it can be seen that the high pressure operation resulted in a permeate with over a 10% improvement in CCR reduction at increased flux rates.

It should be noted that in the accumulated examples above, the process of the present invention can achieve permeate products wherein the Conradson Concarbon Residue (CCR) wt % content of the permeate product is less than 75%, more preferably less than 60%, and even more preferably less than 50% of the Conradson Concarbon Residue (CCR) wt % content of the hydrocarbon feedstream.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

What is claimed is:

1. A process for producing an improved product stream, comprising:
   a) conducting a high molecular weight hydrocarbon feedstream with a final boiling point of at least 1100° F. to a membrane separation zone wherein the feedstream contacts a first side of at least one porous membrane element, wherein the porous membrane element has an average pore size from about 0.001 to about 2 microns;
   b) retrieving at least one retentate product stream from the first side of the porous membrane; and
   c) retrieving at least one permeate product stream from a second side of the porous membrane element;
   wherein the transmembrane pressure across the porous membrane element is from 1000 to about 2000 psig, the retentate product stream has a higher wt % of Conradson Carbon Residue than the hydrocarbon feedstream, and the permeate product stream has a lower wt % of Conradson Carbon Residue than the hydrocarbon feedstream.

2. The process of claim 1, wherein the porous membrane element is selected from a polymer membrane, a porous ceramic membrane, a sintered metal membrane, a porous glass membrane, or a combination thereof.

3. The process of claim 2, wherein the Conradson Carbon Residue content of the hydrocarbon feedstream is at least 1 wt %.

4. The process of claim 3, wherein the permeate product yield rate is at least 20 wt % of the hydrocarbon feedstream feed rate.

5. The process of claim 3, wherein the Conradson Carbon Residue wt % content of the permeate product stream is less than 75% of the Concarbon Carbon Residue wt % content of the hydrocarbon feedstream.

6. The process of claim 5, wherein the hydrocarbon feedstream in the membrane separation zone is from 212 to about 662° F. (100 to 350° C.).

7. The process of claim 6, wherein the hydrocarbon feedstream is selected from whole crudes, topped crudes, synthetic crude blends, oils derived from shale, oils derived from bitumen, oils derived from tar sands, atmospheric resids, vacuum resids, and combinations thereof.

8. The process of claim 6, wherein at least a portion of the permeate product stream is further processed in a catalytic conversion unit.

9. The process of claim 6, wherein the transmembrane pressure across the porous membrane element is from about 1500 psi to about 2000 psi.

10. The process of claim 6, wherein the average boiling point of the permeate product stream is lower than the average boiling point of the retentate product stream.

11. The process of claim 10, wherein the permeate product yield rate is at least 20 wt % of the hydrocarbon feedstream feed rate.

12. The process of claim 11, wherein the Conradson Carbon Residue wt % content of the permeate product stream is less than 60% of the Conradson Carbon Residue wt % content of the hydrocarbon feedstream.

13. The process of claim 12, wherein the Conradson Carbon Residue content of the hydrocarbon feedstream is at least 3 wt %.

14. The process of claim 13, wherein the permeate product yield rate is at least 40 wt % of the hydrocarbon feedstream feed rate.

15. The process of claim 14, wherein the transmembrane pressure across the porous membrane element is from about 1500 psi to about 2000 psi.

16. The process of claim 15, wherein the porous membrane element is selected from a porous ceramic membrane, a sintered metal membrane, or a combination thereof.

17. The process of claim 16, wherein at least a portion of the permeate product stream is further processed in a catalytic conversion unit.

18. The process of claim 1, wherein the transmembrane pressure across the porous membrane element is from about 1500 psi to about 2000 psi.

19. The process of claim 1, wherein the Reynolds number of the hydrocarbon feedstream in the membrane separation zone is above about 2000.

20. The process of claim 1, wherein the Reynolds number of the hydrocarbon feedstream in the membrane separation zone is above about 4000.

21. The process of claim 1, wherein the permeate-side membrane pressure is approximately atmospheric pressure.

22. The process of claim 1, wherein the permeate stream has a Conradson Carbon residue that is about 10-20% lower than the Conradson Carbon Residue of a permeate stream obtained at a transmembrane pressure of about 600 psi.

* * * * *